(12) United States Patent
Zhou

(10) Patent No.: US 10,542,422 B2
(45) Date of Patent: Jan. 21, 2020

(54) DATA BACKUP METHOD, STORAGE MEDIUM AND ELECTRONIC DEVICE

(71) Applicant: GUANGDONG OPPO MOBILE TELECOMMUNICATIONS CORP., LTD., Dongguan, Guangdong (CN)

(72) Inventor: Xuan Zhou, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/318,252

(22) PCT Filed: Jul. 28, 2017

(86) PCT No.: PCT/CN2017/094979
§ 371 (c)(1),
(2) Date: Jan. 16, 2019

(87) PCT Pub. No.: WO2018/076844
PCT Pub. Date: May 3, 2018

(65) Prior Publication Data
US 2019/0174302 A1    Jun. 6, 2019

(30) Foreign Application Priority Data
Oct. 25, 2016  (CN) .......................... 2016 1 0949322

(51) Int. Cl.
*H04W 8/30*       (2009.01)
*H04W 4/60*       (2018.01)
(Continued)

(52) U.S. Cl.
CPC .......... *H04W 8/30* (2013.01); *H04L 63/0853* (2013.01); *H04L 63/0861* (2013.01);
(Continued)

(58) Field of Classification Search
CPC . H04W 12/06; H04W 4/60; H04W 12/00514; H04W 8/183; H04W 84/20;
(Continued)

(56) References Cited

U.S. PATENT DOCUMENTS

2005/0279826 A1* 12/2005 Merrien ............... G06Q 20/341
                                                              235/380
2009/0271849 A1  10/2009 Kodama et al.
2016/0073258 A1   3/2016 Fukuoka

FOREIGN PATENT DOCUMENTS

CN          1731801        2/2006
CN          102176775      9/2011
(Continued)

OTHER PUBLICATIONS

SIPO, First Office Action for CN Application No. 201610949322, dated Jan. 14, 2019.
WIPO, ISR for PCT/CN2017/094979, dated Oct. 31, 2017.

*Primary Examiner* — Nizar N Sivji
(74) *Attorney, Agent, or Firm* — Hodgson Russ LLP

(57) ABSTRACT

A data backup method according to the present invention includes steps of: when a first account is logged in, obtaining information of a SIM card; registering a second account when determining that the SIM card of a terminal is changed from a first SIM card to a second SIM card; executing a predetermined data backup process so as to back up data corresponding to the first account to the second account; and sending a deletion instruction to a server for instructing the server to delete the data corresponding to the first account.

17 Claims, 3 Drawing Sheets

(51) Int. Cl.
　　　*H04L 29/06*　　　(2006.01)
　　　*H04W 8/18*　　　(2009.01)
　　　*H04W 12/06*　　　(2009.01)
　　　*H04W 12/00*　　　(2009.01)
(52) U.S. Cl.
　　　CPC ............ *H04L 63/105* (2013.01); *H04W 4/60* (2018.02); *H04W 8/183* (2013.01); *H04W 12/00514* (2019.01); *H04W 12/06* (2013.01)
(58) Field of Classification Search
　　　CPC . H04L 63/0853; H04L 9/0891; H04L 63/105; G06F 21/31; G06Q 20/341; G06Q 20/355
　　　See application file for complete search history.

(56) References Cited

FOREIGN PATENT DOCUMENTS

| | | |
|---|---|---|
| CN | 103118087 | 5/2013 |
| CN | 103152402 | 6/2013 |
| CN | 104468557 | 3/2015 |
| CN | 104902463 | 9/2015 |
| CN | 105898744 | 8/2016 |
| CN | 105959293 | 9/2016 |
| CN | 106550031 | 3/2017 |

\* cited by examiner

DATA BACKUP METHOD, STORAGE MEDIUM AND ELECTRONIC DEVICE

This application is a U.S. national phase entry of an International Application No. PCT/CN2017/094979, filed on Jul. 28,2017, based on and claims priority of Chinese Patent Application No.201610949322.X, entitled "data backup method and device", filed on Oct. 25, 2016, the entire contents of which are incorporated herein by reference.

FIELD

The present disclosure relates to a communication field, and more particularly to a data backup method, a storage medium and an electronic device.

BACKGROUND

With popularization of smart terminals, a user may have a plurality of terminals at the same time and the user may store different data in different terminals. In order to enable the user to conveniently use the data stored in different terminals, technologies of cloud storage service are developed. Through the cloud storage service, the terminal may upload the data generated during the usage process to the cloud and download the data stored in the cloud to the terminal as required.

DISCLOSURE

Embodiments of the present disclosure provide a data backup method, a storage medium and an electronic device.

Embodiments of the present disclosure provide a data backup method. The data backup method includes: when a first account is logged in, acquiring information of a SIM (subscriber identification module) card of a terminal; when determining according to the information of the SIM card that the SIM card of the terminal is changed from a first SIM card associated with the first account to a second SIM card, registering a second account associated with the second SIM card; executing a predetermined data backup process to back up data corresponding to the first account to the second account; and sending a deletion instruction to a server corresponding to the first account, the deletion instruction being configured to instruct the server to delete the data corresponding to the first account.

Embodiments of the present disclosure provide a non-transitory computer-readable storage medium. The storage medium stores a computer program. When the computer program is executed on a computer, the computer is caused to perform the data backup method provided by the embodiments of the present disclosure.

Embodiments of the present disclosure provide an electronic device. The electronic device includes a processor and a memory. The processor is configured to call the computer program stored in the memory so as to perform the data backup method provided by the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Figure 1:
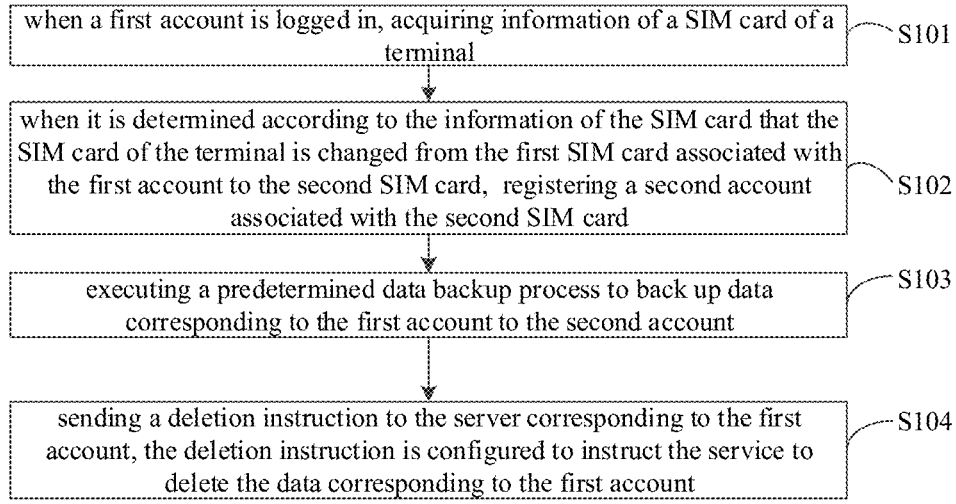
FIG. 1 is flow chart of a data backup method according to an embodiment of the present disclosure.

Throughout the accompanying drawings, the same or similar elements or elements with the same or similar reference numbers have same or similar functions. The principle of the present disclosure will be described by taking the present disclosure being implemented in a proper calculation environment as an example. Embodiments described below are merely exemplary and used for explaining the present disclosure, and should not be understood as limitation to the present disclosure.

In practice, a cloud storage service account registered by a terminal is usually bound to a SIM (subscriber identification module) card. In this case, after the user changes SIM card for the terminal from an old SIM card to a new SIM card, if the old SIM card is used by other persons, data stored using the cloud storage service account can be obtained by other persons due to the binding relation between the old SIM card and the cloud storage service account of the user, which may cause data leakage, i.e., resulting in unsafety of user data.

Embodiments of the present disclosure provide a data backup method. The data backup method includes: when a first account is logged in, acquiring information of a SIM card of a terminal; when determining according to the information of the SIM card that the SIM card of the terminal is changed from a first SIM card associated with the first account to a second SIM card, registering a second account associated with the second SIM card; executing a predetermined data backup process to back up data corresponding to the first account to the second account; and sending a deletion instruction to a server corresponding to the first account, the deletion instruction being configured to instruct the server to delete the data corresponding to the first account.

In an embodiment, after sending the deletion instruction to the server corresponding to the first account, the method further includes: sending a cancellation instruction to the server corresponding to the first account, the cancellation instruction being configured to instruct the server to cancel the first account.

In an embodiment, registering the second account associated with the second SIM card includes: acquiring first authentication information corresponding to the first account and second authentication information corresponding to the second SIM card; and when determining that the first authentication information matches the second authentication information, registering the second account associated with the second SIM card.

In an embodiment, acquiring the first authentication information corresponding to the first account and the second authentication information corresponding to the second SIM card includes: acquiring first user fingerprint information corresponding to the first account and second user fingerprint information corresponding to the second SIM card. When determining that the first authentication information matches the second authentication information, registering the second account associated with the second SIM card includes: when determining that the first user fingerprint information matches the second user fingerprint information, registering the second account associated with the second SIM card.

In an embodiment, executing the predetermined data backup process to back up the data corresponding to the first account to the second account includes: executing the predetermined data backup process and sending a backup instruction to the server corresponding to the first account according to the predetermined data backup process, the backup instruction being configured to instruct the server to back up the data corresponding to the first account to the second account.

In an embodiment, executing the predetermined data backup process to back up the data corresponding to the first account to the second account includes: sending an instruction to the server according to the predetermined data backup process, the instruction being configured to instruct the server to transmit the data corresponding to the first account to the terminal; receiving the data corresponding to the first account from the server; and after detecting that data updating occurs, uploading updated data to a storage space corresponding to the second account in the server, the updated data comprising the data corresponding to the first account.

In an embodiment, acquiring the first authentication information corresponding to the first account and the second authentication information corresponding to the second SIM card includes: acquiring a first authentication password corresponding to the first account and a second authentication password corresponding to the second SIM card. When determining that the first authentication information matches the second authentication information, registering the second account associated with the second SIM card includes: when determining that the first authentication password matches the second authentication password, registering the second account associated with the second SIM card.

As illustrated in FIG. 1, FIG. 1 is a flow chart of a data backup method according to an embodiment of the present disclosure. The flow of the data backup method may include the followings.

At block S101, when a first account is logged in, information of a SIM card of a terminal may be acquired.

In some embodiments, an execution subject of the embodiments of the present disclosure may be a smartphone, a tablet computer or other terminal devices.

At present, when the user registers an account, for example, registering a cloud service account, the account is typically bound to the SIM card in an association manner. However, in practice, the user may change the SIM card. For example, when user A registers a cloud service account, the cloud service account is associated with SIM card A of the terminal. If the user A changes the SIM card A to SIM card B and the SIM card is used by a terminal of user B, since the SIM card A has an association relationship with the cloud service account of the user A, the user B holding the SIM card A may obtain data stored by the user A using the cloud service account, thus resulting in unsafety of the data corresponding to the cloud service account of the user A.

In block S101, when the terminal detects that the first account is logged in using the terminal, the terminal is triggered to acquire the information of the SIM card used by the terminal. According to the information of the SIM card, the terminal may determine whether the SIM card used by the terminal is changed from a first SIM card corresponding to the first account to another SIM card, i.e., determining whether the SIM card used by the terminal is changed from the first SIM card to a second SIM card.

In an embodiment, the terminal may acquire the information of the SIM card associated with the first account in advance. When the first account is logged in using the terminal, the terminal acquires the information of the SIM card currently used by the terminal, and compares the information of the SIM card currently used by the terminal with the information of the first SIM card. When a comparison result indicates that the information of the SIM card currently used by the terminal is consistent with the information of the first SIM card, it can be considered that the SIM card currently used by the user is the first SIM card, i.e., the SIM card used by the terminal is unchanged. When the comparison result indicates that the information of the SIM card currently used by the terminal is inconsistent with the information of the first SIM card, it can be considered that the SIM card currently used by the user is a SIM card other than the first SIM card, i.e., the SIM card used by the terminal is changed.

When the terminal determines that the SIM card used by the terminal is unchanged, the terminal may continue executing current operations. When the terminal determines that the SIM card used by the terminal is changed from the first SIM card to the second SIM card, an act at block S102 is executed.

At block S102, when it is determined according to the information of the SIM card that the SIM card of the terminal is changed from the first SIM card associated with the first account to the second SIM card, a second account associated with the second SIM card is registered.

For example, when the terminal determines according to the information of the SIM card the SIM card used by the terminal is changed from the first SIM card associated with the first account to the second SIM card, the terminal may be used to register an account (i.e., the second account) associated with the second SIM card according to the second SIM card.

At block S103, a predetermined data backup process is executed to back up data corresponding to the first account to the second account.

For example, after the second account is registered, the terminal is triggered to call and executer the predetermined data backup process, such that the data corresponding to the first account can be backed up to the second account.

For example, in an embodiment, the terminal may send an instruction to a server storing the data corresponding to the first account according to the predetermined data backup process. The instruction is configured to instruct the terminal to copy the data stored in a storage space corresponding to the first account to a storage space corresponding to the second account.

At block S104, a deletion instruction is sent to the server corresponding to the first account. The deletion instruction is configured to instruct the service to delete the data corresponding to the first account.

For example, after determining that the data corresponding to the first account is backed up to the second account, the terminal may send the deletion instruction to the server corresponding to the first account. The deletion instruction is configured to instruct the server to delete the data stored in the storage space corresponding to the first account.

In the embodiments of the present disclosure, by registering the second account, backing up the data corresponding to the first account to the second account and deleting the data corresponding to the first account from the server, unsafety of user data due to the first SIM card associated with the first account being used by other users can be avoided effectively, and it is ensured that the user data is not lost.

Figure 2:
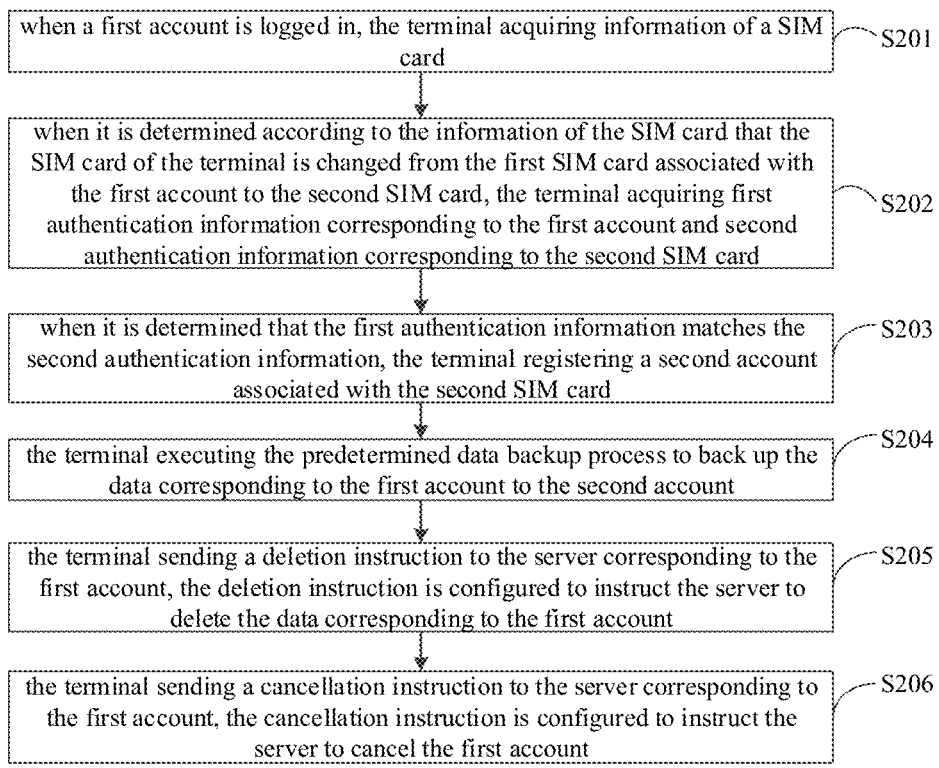
FIG. 2 is a flow chart of a data backup method according to another embodiment of the present disclosure.

As illustrated in FIG. 2, FIG. 2 is a flow chart of a data backup method according to another embodiment of the present disclosure. The flow of the data backup method may include the followings.

At block S201, when a first account is logged in, the terminal acquires information of a SIM card.

For example, the terminal may be a mobile phone.

For example, when it is detected that the first account using cloud storage service is logged in using the mobile phone, the mobile phone may be triggered to acquire the information of the SIM card used by the mobile phone. The mobile phone may determine according to the information of the SIM card whether the SIM card used by the mobile phone is changed, i.e., determining whether the SIM card used by the mobile phone is changed from a first SIM card associated with the first account to another SIM card, for example, a second SIM card.

In an embodiment, when the mobile phone binds the first account to the first SIM card used by the mobile phone in an association manner, the mobile phone is triggered to acquire the information of the first SIM card, and to store the information of the first SIM card into a predetermined document. When it is detected that the first account is logged in using the mobile phone, the mobile phone may be triggered to acquire the information of the SIM card currently used by the mobile phone, and to compare the information of the SIM card currently used by the mobile phone with the information of the first SIM card stored in the predetermined document so as to determine whether the SIM card currently used by the mobile phone is the first SIM card.

When a comparison result indicates that the information of the SIM card currently used by the mobile phone is consistent with the information of the first SIM card, it can be considered that the SIM card currently used by the mobile phone is the first SIM card, i.e., the SIM card currently used by the mobile phone is unchanged. In this case, the mobile phone may continue executing related operations.

When the comparison result indicates that the information of the SIM card currently used by the mobile phone is inconsistent with the information of the first SIM card, it can be considered that the SIM card currently used by the mobile phone is not the first SIM card associated with the first account, i.e., the SIM card currently used by the mobile phone is changed. In this case, an act at block S202 is executed.

At block S202, when it is determined according to the information of the SIM card that the SIM card of the terminal is changed from the first SIM card associated with the first account to the second SIM card, the terminal acquires first authentication information corresponding to the first account and second authentication information corresponding to the second SIM card.

At block S203, when it is determined that the first authentication information matches the second authentication information, the terminal registers a second account associated with the second SIM card.

For example, the acts at blocks S202 and S203 may include the followings.

When the mobile phone determines that the SIM card currently used by the mobile phone is changed from the first SIM card associated with the first account to the second SIM card, the mobile phone is triggered to acquire the first authentication information corresponding to the first account and the second authentication information corresponding to the second SIM card. In an embodiment, the first authentication information and the second authentication information can be used to verify an identity of the user.

After the first authentication information corresponding to the first account and the second authentication information corresponding to the second SIM card, the mobile phone may determine whether the first authentication information matches the second authentication information. When the mobile phone determines that the first authentication information does not match the second authentication information, it can be considered the first account registered on the mobile phone is illegal. In this case, the mobile phone may use another way to verify the identity of the user, or cancel the first account on the mobile phone, which is not limited herein.

When the mobile phone determines that the first authentication information matches the second authentication information, it can be considered that the user of the first account changes the SIM card for the mobile phone. In this case, the mobile phone may register a second account associated with the second SIM card currently used by the mobile phone for the user according to the changed SIM card, i.e., the second SIM card.

In an embodiment, the act of the terminal acquiring the first authentication information corresponding to the first account and the second authentication information corresponding to the second SIM card in block S202 may include acquiring by the terminal first user fingerprint information corresponding to the first account and second user fingerprint information corresponding to the second SIM card.

The act of the terminal registering the second account associated with the second SIM card when determining that the first authentication information matches the second authentication information may include: when determining that the first user fingerprint information matches the second user fingerprint information, registering by the terminal the second account associated with the second SIM card.

For example, when the user registers the first account on the mobile phone, the user may be required to input fingerprint information of the user on the mobile phone, and the mobile phone determines the fingerprint information as the first user fingerprint information and associates the first user fingerprint information with the first account. The mobile phone may store the first user fingerprint information into a document in the mobile phone. When determining that the subscriber identification mode used by the mobile phone is changed from the first SIM card to the second SIM card, the mobile phone may require the user to input the fingerprint information, i.e., the mobile phone may receive the second user fingerprint information corresponding to the second SIM card.

The mobile phone may determine whether the first user fingerprint information matches the second user fingerprint information. When the first user fingerprint information does not match the second user fingerprint information, it can be considered that the first account logged in using the mobile phone is illegal. When the first user fingerprint information matches the second user fingerprint information, it can be considered that the user of the first account changes the SIM card for the mobile phone. In this case, the mobile phone may register the second account associated with the second SIM card for the user according to the second SIM card.

In some embodiments, by verifying whether the first authentication information corresponding to the first account matches the second authentication information corresponding to the second SIM card, and registering the second account according to the second SIM card when the first authentication information matches the second authentication information, safety of the first account may be improved, such that data leakage due to embezzling of the account can be avoided effectively.

In other embodiments, besides verifying the user fingerprint information, the terminal may further verify other information to ensure the safety of the first account. For example, the user may set an authentication password or set an authentication question and a corresponding authentication answer for the first account in advance. When the terminal determines that the SIM card used by the terminal is not the first SIM card associated with the first account, the user of the terminal is required to input the authentication password or an answer to the authentication question corresponding to the first account. Only when the user inputs the correct authentication password or the correct authentication answer, the terminal registers the second account according to the second SIM card.

In an embodiment, the act of the terminal acquiring the first authentication information corresponding to the first account and the second authentication information corresponding to the second SIM card in block S202 may include acquiring by the terminal the authentication password corresponding to the first account and the authentication password corresponding to the second SIM card.

The act of the terminal registering the second account associated with the second SIM card when the first authentication information matches the second authentication information in block S203 may include: when determining that the authentication password corresponding to the second account matches the authentication password corresponding to the first account, registering by the terminal the second account associated with the second SIM card.

At block S204, the terminal executes the predetermined data backup process to back up the data corresponding to the first account to the second account.

For example, after the mobile phone registers the second account associated with the second SIM card according to the second SIM card, the mobile phone may be triggered to call and execute the predetermined data backup process, such that the data stored in the first account may be backed up to the second account.

In an embodiment, the act at block S204 may include executing the predetermined data backup process and sending a backup instruction to the server corresponding to the first account according to the predetermined data backup process, the backup instruction being configured to instruct the server to back up the data corresponding to the first account to the second account.

For example, the mobile phone calls the predetermined data backup process and sends the backup instruction to the server corresponding to the first account according to the predetermined data backup process. The backup instruction is configured to instruct the server to back up the data stored in the storage space corresponding to the first account to the storage space corresponding to the second account.

In another embodiment, the mobile phone may send an instruction to the server corresponding to the first account. The instruction is configured to instruct the server to transmit the data stored under the first account to the mobile phone. After receiving the data corresponding to the first account sent by the server, the mobile phone may store the data thereon. Since the mobile phone currently uses the second SIM card and the second account associated with the second SIM card, after the mobile phone detects that the user updates the data on the mobile phone, the mobile phone may upload the data on the mobile phone (the updated data including the data corresponding to the first account downloaded from the server) to the server and the data can be stored in the storage space corresponding to the second account in the server.

In another embodiment, the act of the terminal executing the predetermined data backup process to back up the data corresponding to the first account to the second account in block S204 may include: sending an instruction to the server according to the predetermined data backup process, the instruction being configured to instruct the server to transmit the data corresponding to the first account to the terminal; receiving the data corresponding to the first account from the server; and after detecting that data updating occurs, uploading updated data to a storage space corresponding to the second account in the server, the updated data comprising the data corresponding to the first account.

At block S205, the terminal sends a deletion instruction to the server corresponding to the first account. The deletion instruction is configured to instruct the server to delete the data corresponding to the first account.

For example, after the mobile phone determines that the server corresponding to the first account backs up the data corresponding to the first account to the second account, the mobile phone may send the deletion instruction to the server corresponding to the first account. The deletion instruction is configured to instruct the server to delete the data stored in the storage space of the first account.

In some embodiments, by deleting the data stored in the storage space of the first account, the data leakage of the first account due to the user no longer using the first SIM card associated with the first account can be avoided effectively.

At block S206, the terminal sends a cancellation instruction to the server corresponding to the first account. The cancellation instruction is configured to instruct the server to cancel the first account.

For example, after the instruction for instructing the server to delete the data corresponding to the first account is sent to the server, the mobile phone may further send the cancellation instruction to the server. The cancellation instruction is configured to instruct the server to cancel the first account. In other words, after the server receives the cancellation instruction, the first account is cancelled.

In some embodiments, by cancelling the first account, the storage space occupied by the first account can be released, a purpose of saving the storage space of the server may be achieved.

In an embodiment, if the server corresponding to the first account detects other user terminals associated with the first account, the server may send a message indicating that the first account is cancelled to the user terminals, so as to prompt the user terminals to associate with the second account. For example, in block S206, terminal A sends the cancellation instruction to the server corresponding to the first account. The cancellation instruction is configured to instruct the server to cancel the first account. When the server detects that the first account is further associated with terminal B after receiving the cancellation instruction, the server sends the message indicating that the first account is cancelled to the terminal B and prompts the user B to associate with the second account.

Figure 3:
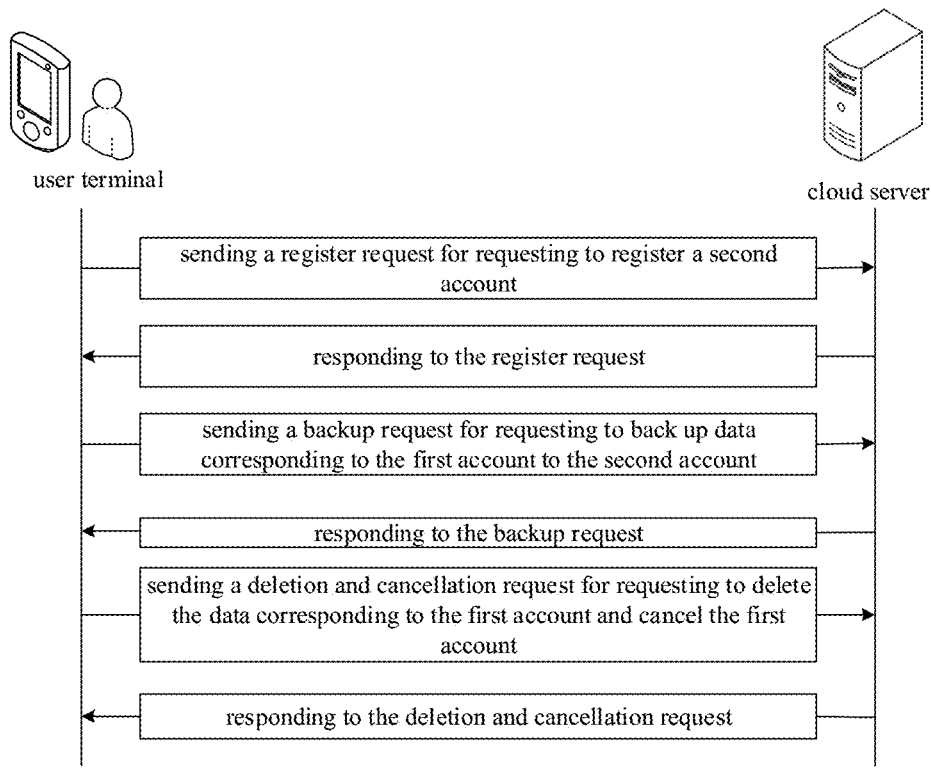
FIG. 3 is a schematic diagram of a scene provided in an embodiment of the present disclosure.

As illustrated in FIG. 3, FIG. 3 is a schematic diagram of a scene provided by an embodiment of the present disclosure.

For example, when determining that a first account is logged in using a user terminal, the user terminal acquires information of the SIM card of the user terminal. The user terminal may determine according to the information of the SIM card whether the SIM card used by the user terminal is changed from a first SIM card corresponding to the first account to another SIM card, for example a second SIM card. When the SIM card used by the user terminal is changed from the first SIM card to another SIM card, the user terminal may generate a prompt message to prompt the user to input fingerprint information on the user terminal.

After acquiring the fingerprint information inputted by the user, the user terminal may determine the fingerprint information as second user fingerprint information corresponding to the second SIM card. The user terminal may acquire first user fingerprint information corresponding to the first account. The first user fingerprint information may be stored in the user terminal or the cloud server in advance. If the user terminal determines that the first user fingerprint information matches the second user fingerprint information, it can be considered that the user changes the SIM card for the user terminal.

In this case, the user terminal may send a register request to the cloud server. The register request may carry information on the second SIM card, and is configured to instruct the cloud server to register the second account associated with the second SIM card. The cloud server responds to the register request and send information of the newly registered second account to the user terminal.

The user terminal may send a backup request to the cloud server. The backup request is configured to instruct the cloud server to back up data stored in a storage space corresponding to the first account to a storage space corresponding to the second account. The cloud server may respond to the backup request and feed back a message indicating successful backup to the user terminal.

The user terminal may send a deletion and cancellation request to the cloud server. The deletion and cancellation request is configured to instruct the cloud server to delete the data stored in the storage space corresponding to the first account and cancel the first account. The cloud server responds to the deletion and cancellation request and feeds back a message indication the data corresponding to the first account is successfully deleted and the first account is canceled successfully to the user terminal.

Embodiments of the present disclosure provide a data backup device. The data backup device includes an acquiring unit, a registering unit, an executing unit and a first sending unit.

The acquiring unit is configured to, when a first account is logged in, acquire information of a SIM card of a terminal.

The registering unit is configured to, when determining according to the information of the SIM card that the SIM card of the terminal is changed from a first SIM card associated with the first account to a second SIM card, register a second account associated with the second SIM card.

The executing unit is configured to execute a predetermined data backup process to back up data corresponding to the first account to the second account.

The first sending unit is configured to send a deletion instruction to a server corresponding to the first account, the deletion instruction being configured to instruct the server to delete the data corresponding to the first account.

In an embodiment, the data backup device may further include a second sending unit configured to send a cancellation instruction to the server corresponding to the first account, the cancellation instruction being configured to instruct the server to cancel the first account.

In an embodiment, the registering unit may be configured to: acquire first authentication information corresponding to the first account and second authentication information corresponding to the second SIM card; and when determining that the first authentication information matches the second authentication information, register the second account associated with the second SIM card.

In an embodiment, the registering unit may be configured to: acquire first user fingerprint information corresponding to the first account and second user fingerprint information corresponding to the second SIM card; and when determining that the first user fingerprint information matches the second user fingerprint information, register the second account associated with the second SIM card.

In an embodiment, the executing unit may be configured to execute the predetermined data backup process and send a backup instruction to the server corresponding to the first account according to the predetermined data backup process, the backup instruction being configured to instruct the server to back up the data corresponding to the first account to the second account.

In an embodiment, the executing unit may be configured to: send an instruction to the server according to the predetermined data backup process, the instruction being configured to instruct the server to transmit the data corresponding to the first account to the terminal; receive the data corresponding to the first account from the server; and after detecting that data updating occurs, upload updated data to a storage space corresponding to the second account in the server, the updated data comprising the data corresponding to the first account.

In an embodiment, the registering unit may be configured to: acquire a first authentication password corresponding to the first account and a second authentication password corresponding to the second SIM card; and when determining that the first authentication password matches the second authentication password, register the second account corresponding to the second SIM card.

Figure 4:
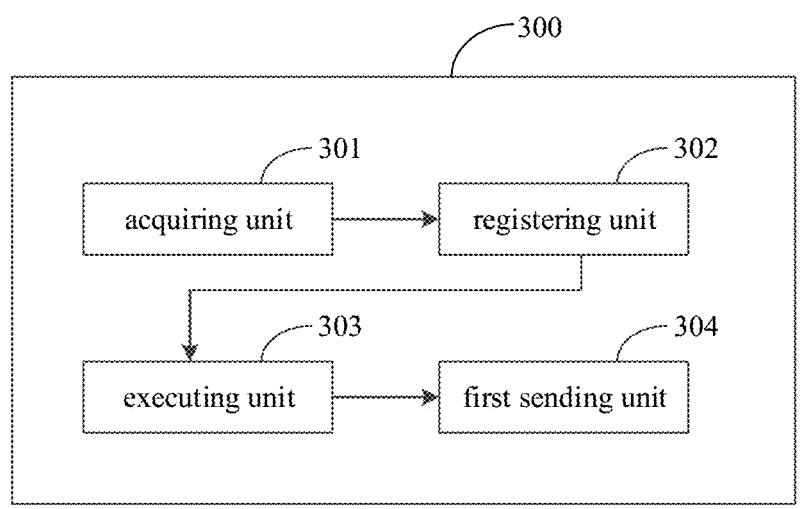
FIG. 4 is a block diagram of a data backup device according to an embodiment of the present disclosure.

As illustrated in FIG. 4, FIG. 4 is a block diagram of a data backup device according to an embodiment of the present disclosure. The data backup device 300 may include an acquiring unit 301, a registering unit 302, an executing unit 303 and a first sending unit 304.

The acquiring unit 301 is configured to, when a first account is logged in, acquire information of a SIM card of a terminal.

For example, when detecting that the first account using cloud storage service is logged in using the terminal, the acquiring unit 301 of the terminal is triggered to acquire the information of the SIM card used by the terminal.

According to the information of the SIM card acquired by the acquiring unit 301, the terminal may determine whether the SIM card used by the terminal is changed from a first SIM card associated with the first account to another SIM card, i.e., a second SIM card.

When the terminal determines that the SIM card used by the terminal is the first SIM card associated with the first account, the terminal may continue executing current operations.

The registering unit 302 is configured to, when determining according to the information of the SIM card that the SIM card of the terminal is changed from a first SIM card associated with the first account to a second SIM card, register a second account associated with the second SIM card.

For example, when the terminal determines according to the information of the SIM card acquired by the acquiring unit 301 that the SIM card used by the terminal is changed from the first SIM card associated with the first account to the second SIM card, the terminal may trigger the registering unit 302 to register the second account associated with the second SIM card according to the second SIM card.

In an embodiment, the registering unit 302 may register the second account associated with the second SIM card by: acquiring first authentication information corresponding to the first account and second authentication information corresponding to the second SIM card; and when determining that the first authentication information matches the second authentication information, registering the second account associated with the second SIM card.

For example, the registering unit 302 may acquire the first authentication information corresponding to the first account and the second authentication information corresponding to the second SIM card. In some embodiments, the first authentication information and the second authentication information are configured to verify an identity of the user.

After acquiring the first authentication information corresponding to the first account and the second authentication information corresponding to the second SIM card, the registering unit 302 may determine whether the first authentication information matches the second authentication information. When the registering unit 302 determines that the first authentication information does not match the second authentication information, it can be considered that the first account logged in using the terminal is illegal. In this case, the terminal may use another way to verify the identity of the user or cancel the first account on the terminal, which is not limited herein.

When the registering unit 302 determines that the first authentication information matches the second authentication information, it can be considered that the user of the first account changes the SIM card for the terminal. In this case, the terminal can register the second account associated with the second SIM card currently used by the terminal for the user according to the second SIM card.

In an embodiment, the act of acquiring the first authentication information corresponding to the first account and the second authentication information corresponding to the second subscriber module may include acquiring first user fingerprint information corresponding to the first account and second user fingerprint information corresponding to the second SIM card.

When it is determined that the first authentication information matches the second authentication information, the terminal registers the second account associated with the second SIM card as follows. When it is determined that the first user fingerprint information matches the second user fingerprint information, the terminal registers the second account associated with the second SIM card.

For example, when the user registers the first account on the terminal, the user may be required to input fingerprint information of the user on the terminal. The terminal determines the fingerprint information as the first user fingerprint information and associates the first user fingerprint information with the first account. The terminal stores the first user fingerprint information in a document of the terminal.

When it is determined that the SIM card used by the terminal is changed from the first SIM card to the second SIM card, the terminal may require the user to input the fingerprint information, i.e., the terminal may receive the second user fingerprint information corresponding to the second SIM card.

The terminal may determine whether the first user fingerprint information matches the second user fingerprint information. When the first user fingerprint information does not match the second user fingerprint information, it can be considered that the first account currently logged in using the mobile phone is illegal. When the first user fingerprint information matches the second user fingerprint information, it can be considered that the user of the first account changes the SIM card for the terminal. In this case, the terminal may register the second account associated with the second SIM card for the user according to the second SIM card.

In some embodiments, by verifying whether the first authentication information corresponding to the first account matches the second authentication information corresponding to the second SIM card, and registering the second account according to the second SIM card when the first authentication information matches the second authentication information, safety of the first account may be improved, such that data leakage due to embezzling of the account can be avoided effectively.

The executing unit 303 is configured to execute a predetermined data backup process to back up data corresponding to the first account to the second account.

For example, after the registering unit 302 registers the second account associated with the second SIM card according to the SIM card, the executing unit 303 of the terminal is triggered to call and execute the predetermined data backup process, such that the data stored under the first account may be backed up to the second account.

In an embodiment, the executing unit 303 may be configured to execute the predetermined data backup process and sending a backup instruction to the server corresponding to the first account according to the predetermined data backup process, the backup instruction being configured to instruct the server to back up the data corresponding to the first account to the second account.

For example, the executing unit 303 may call the predetermined data backup process and send the backup instruction to the server corresponding to the first account according to the predetermined data backup process. The backup instruction is configured to instruct the server to back up the data stored in the storage space corresponding to the first account to the storage space corresponding to the second account. The server backs up the data corresponding to the first account to the second account according to the backup instruction after receiving the backup instruction.

The first sending unit 304 is configured to send a deletion instruction to a server corresponding to the first account, the deletion instruction being configured to instruct the server to delete the data corresponding to the first account.

For example, after the terminal determines that the server corresponding to the first account backs up the data corresponding to the first account to the second account, the first sending unit 304 of the mobile may send the deletion instruction to the server corresponding to the first account. The deletion instruction is configured to instruct the server to delete the data stored in the storage space of the first account.

In some embodiments, by deleting the data stored in the storage space of the first account, the data leakage of the first account due to the user no longer using the first SIM card associated with the first account can be avoided effectively.

Figure 5:
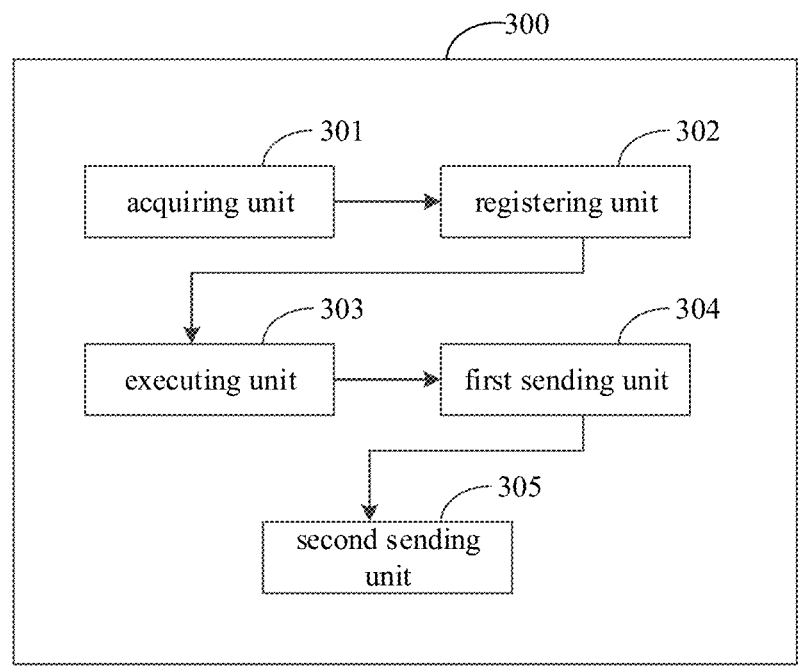
FIG. 5 is a block diagram of a data backup device according to an embodiment of the present disclosure.

As illustrated in FIG. 5, FIG. 5 is a block diagram of a data backup device according to a third embodiment of the present disclosure. The data backup device 300 may further include a second sending unit 305.

The second sending unit 305 is configured to send a cancellation instruction to the server corresponding to the first account. The cancellation instruction is configured to instruct the server to cancel the first account.

For example, after the instruction for instructing the server to delete the data corresponding to the first account is sent to the server, the second sending unit 305 of the terminal may further send the cancellation instruction to the server. The cancellation instruction is configured to instruct the server to cancel the first account. In other words, after the server receives the cancellation instruction, the first account is cancelled.

In some embodiments, by cancelling the first account, the storage space occupied by the first account can be released, a purpose of saving the storage space of the server may be achieved.

Embodiments of the present disclosure provide a storage medium. The storage medium has a computer program stored thereon. When the computer program is executed on a computer, the computer is caused to perform the data backup method provided by the embodiments of the present disclosure.

Embodiments of the present disclosure further provide an electronic device.

Figure 6:
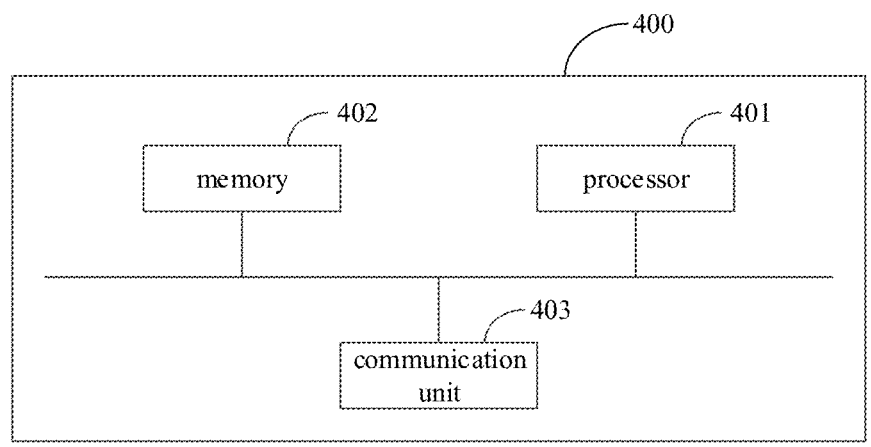
FIG. 6 is a block diagram of an electronic device according to an embodiment of the present disclosure.

As illustrated in FIG. 6, FIG. 6 is a block diagram of the electronic device 400 according to an embodiment of the present disclosure. The electronic device 400 may include a processor 401 including one or more processing cores, a memory 402 including one or more computer-readable storage mediums and a communication unit 403.

The processor 401 is a control center of the electronic device, which utilizes various interfaces and wires to couple various parts of the terminal. By running or executing the software program and/or modules stored in the memory 402, and by invoking data stored in the memory 402, the various functions and data processing functions may be executed, thus integrally monitoring the electronic device.

The memory 402 may be configured to store software programs or modules. The processor 401 is configured to execute various functional applications and data processes of the mobile phone by running the software programs and modules stored in the memory 402.

The communication unit 403 may be configured to receive and transmit signals during a process of transmitting and receiving a message. The communication unit 403 may be configured to receive a signal from a server and to transmit the signal to one or more processors 401 for processing. Alternatively, the communication unit 403 may be configured to transmit a feedback signal sent by the processor 401 to the server.

In an embodiment, the processor 401 in the electronic device may load an executable document corresponding to processes of one or more application programs to the memory 402 and execute the application programs stored in the memory 402 to perform: when a first account is logged in, acquiring information of a SIM card of a terminal; when determining according to the information of the SIM card that the SIM card of the terminal is changed from a first SIM card associated with the first account to a second SIM card, registering a second account associated with the second SIM card; executing a predetermined data backup process to back up data corresponding to the first account to the second account; and sending a deletion instruction to a server corresponding to the first account, the deletion instruction being configured to instruct the server to delete the data corresponding to the first account.

Figure 7:
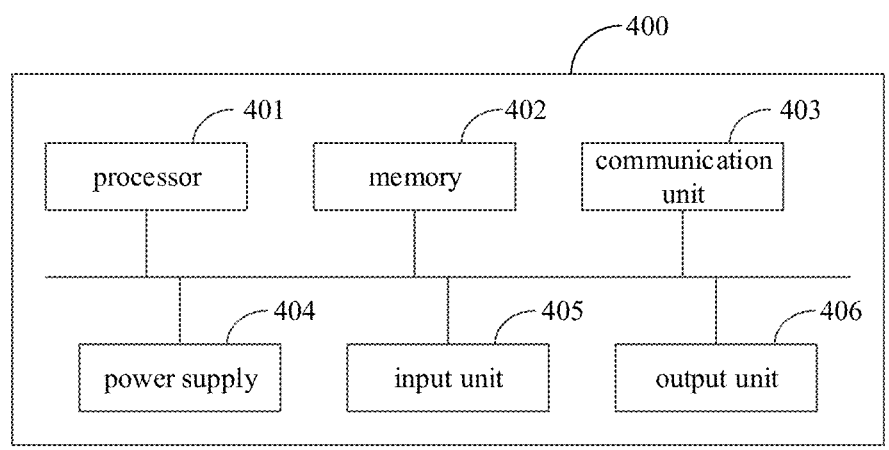
FIG. 7 is a block diagram of an electronic device according to another embodiment of the present disclosure.

As illustrated in FIG. 7, in other embodiments, the electronic device 400 may further include a power supply 404, an input unit 405, an output unit 406 and other components. It will be understood by those skilled in the art that the structure of the server illustrated in FIG. 7 does not constitute a limitation to the server, and may include more or less components than those illustrated, or some components may be combined, or the components may be arranged differently.

The power supply 404 may be logically coupled to the processor 401 via a power management system, thereby managing charging, discharging and power consumption via the power management system.

The input unit 405 may be configured to receive figure or character information inputted and generate a key signal input, a mouse signal input, an operating level signal input, an optical signal input or a trackball signal input related to a user setup or function control.

The output unit 406 may be configured to display information inputted by the user or information provided to the user, and various graphic user interfaces of the terminal. The graphic user interfaces may be formed by graphic, text, icons, videos or any combination thereof. The output unit 406 may include a display panel.

In an embodiment, after sending the deletion instruction to the server corresponding to the first account, the processor 401 may further perform: sending a cancellation instruction to the server corresponding to the first account, the cancellation instruction is configured to instruct the server to cancel the first account.

In an embodiment, when the processor 401 registers the second account associated with the second SIM card, the processor 401 may perform: acquiring first authentication information corresponding to the first account and second authentication information corresponding to the second SIM card; when determining that the first authentication information matches the second authentication information, registering the second account associated with the second SIM card.

In an embodiment, when the processor 401 acquires the first authentication information corresponding to the first account and the second authentication information corresponding to the second SIM card, the processor 401 may perform: acquiring first user fingerprint information corresponding to the first account and second user fingerprint information corresponding to the second SIM card.

When the processor 401 registers the second account associated with the second SIM card when determining that the first authentication information matches the second authentication information, the processor 401 may perform: when determining that the first user fingerprint information matches the second user fingerprint information, registering the second account associated with the second SIM card.

In an embodiment, when the processor 401 executes the predetermined data backup process to back up the data corresponding to the first account to the second account, the processor 401 may perform: executing the predetermined data backup process and sending a backup instruction to the server corresponding to the first account according to the predetermined data backup process, the backup instruction being configured to instruct the server to back up the data corresponding to the first account to the second account.

In an embodiment, when the processor 401 executes the predetermined data backup process to back up the data corresponding to the first account to the second account, the processor 401 may perform: sending to the server according to the predetermined data backup process an instruction for instructing the server to transmit the data corresponding to the first account to the electronic device; receiving the data corresponding to the first account from the server; when detecting that data updating occurs, uploading updated data to a storage space corresponding to the second account in the server, the updated data including the data corresponding to the first account.

In an embodiment, when the processor 401 acquires the first authentication information corresponding to the first account and the second authentication information corresponding to the second SIM card, the processor 401 may perform acquiring an authentication password corresponding to the first account and an authentication corresponding to the second SIM card.

When the processor 401 registers the second account associated with the second SIM card when determining that the first authentication information matches the second authentication information, the processor 401 may perform: when determining that the authentication password corresponding to the first account matches the second authentication password corresponding to the second SIM card, registering the second account associated with the second SIM card.

In above embodiments, description of the embodiments refer to different aspects. Regarding details not described in an embodiment, reference can be made to description of other embodiments.

In embodiments of the present disclosure, the data backup device and the data backup method described in the embodiments belong to a same conception. Any of the data backup methods described in the method embodiments can be executed on the data backup device. The implementation of the data backup device can refer to the method embodiments of the data backup method, which will not be described herein.

It should be noted that, those skilled in the art shall understand that all or parts of the steps in the above data backup method of the present disclosure may be achieved by commanding the related hardware with programs. The programs may be stored in a computer readable storage medium, for example, a memory of the terminal, and the programs may be executed by at least one processor in the terminal. When the programs are executed, one or a combination of the steps of the method in the above-described embodiments may be completed. The memory may include a disc, an optical disk, a Read-Only Memory (ROM), or a Random Access Memory (RAM).

In the data backup device according to the embodiments of the present disclosure, individual functional units may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium. The storage medium may include an ROM, an RAM, a magnet disk, an optical disk and the like.

The forgoing description is only directed to preferred embodiments of the present disclosure, but not used to limit the present disclosure. Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure. In conclusion, the specification cannot be construed to limit the present disclosure.

What is claimed is:

1. A data backup method, comprising:
   when a first account is logged in, acquiring information of a current SIM (subscriber identification module) card of a terminal, wherein the first account is bound to a preset first SIM card;
   when determining according to the information of the current SIM card that the current SIM card is a second SIM card instead of the first SIM card, registering a second account associated with the second SIM card, wherein the second account is bound to the second SIM card;
   executing a predetermined data backup process to back up data corresponding to the first account to the second account, comprising: sending an instruction to a server storing data corresponding to the first account according to the predetermined data backup process, wherein the instruction is configured to instruct the terminal to copy the data stored in a storage space corresponding to the first account to a storage space corresponding to the second account; and
   sending a deletion instruction to a server corresponding to the first account, the deletion instruction being configured to instruct the server to delete the data corresponding to the first account.

2. The method according to claim 1, further comprising:
   sending a cancellation instruction to the server corresponding to the first account, the cancellation instruction being configured to instruct the server to cancel the first account.

3. The method according to claim 2, wherein, registering the second account associated with the second SIM card comprises:
   acquiring first authentication information corresponding to the first account and second authentication information corresponding to the second SIM card; and
   when determining that the first authentication information matches the second authentication information, registering the second account associated with the second SIM card.

4. The method according to claim 3, wherein, the first authentication information is first user fingerprint information corresponding to the first account and the second authentication information is second user fingerprint information corresponding to the second account associated with the second SIM card.

5. The method according to claim 3, wherein, the first authentication information is a first authentication password corresponding to the first account and the second authentication information is a second authentication password corresponding to the second account associated with the second SIM card.

6. The method according to claim 3, wherein, when determining that the first authentication information matches the second authentication information, registering the second account associated with the second SIM card comprises:
   sending a register request carrying information of the second SIM card, so as to instruct the server to register the second account.

7. The method according to claim 1, wherein, executing the predetermined data backup process to back up the data corresponding to the first account to the second account comprises:
sending a backup instruction to the server corresponding to the first account according to the predetermined data backup process, the backup instruction being configured to instruct the server to back up the data corresponding to the first account to the second account.

8. The method according to claim 1, wherein, executing the predetermined data backup process to back up the data corresponding to the first account to the second account comprises:
sending an instruction to the server according to the predetermined data backup process, the instruction being configured to instruct the server to transmit the data corresponding to the first account to the terminal;
receiving the data corresponding to the first account from the server; and
after detecting that data updating occurs, uploading updated data to a storage space corresponding to the second account in the server, the updated data comprising the data corresponding to the first account.

9. A non-transient computer-readable storage medium, having a computer program stored therein, wherein when the computer program is executed on a computer, the computer is caused to perform:
when a first account is logged in, acquiring information of a current SIM (subscriber identification module) card of a terminal, wherein the first account is bound to a preset first SIM card;
when determining according to the information of the current SIM card that the current SIM card is a second SIM card instead of the first SIM card, registering a second account associated with the second SIM card, wherein the second account is bound to the second SIM card;
executing a predetermined data backup process to back up data corresponding to the first account to the second account, comprising: sending an instruction to a server storing data corresponding to the first account according to the predetermined data backup process, wherein the instruction is configured to instruct the terminal to copy the data stored in a storage space corresponding to the first account to a storage space corresponding to the second account; and
sending a deletion instruction to a server corresponding to the first account, the deletion instruction being configured to instruct the server to delete the data corresponding to the first account.

10. An electronic device, comprising a processor and a memory, wherein the processor is configured to call a computer program stored in the memory to perform:
when a first account is logged in, acquiring information of a current SIM (subscriber identification module) card of a terminal, wherein the first account is bound to a preset first SIM card;
when determining according to the information of the current SIM card that the current SIM card is a second SIM card instead of the first SIM card, registering a second account associated with the second SIM card, wherein the second account is bound to the second SIM card;
executing a predetermined data backup process to back up data corresponding to the first account to the second account, comprising: sending an instruction to a server storing data corresponding to the first account according to the predetermined data backup process, wherein the instruction is configured to instruct the terminal to copy the data stored in a storage space corresponding to the first account to a storage space corresponding to the second account; and
sending a deletion instruction to a server corresponding to the first account, the deletion instruction being configured to instruct the server to delete the data corresponding to the first account.

11. The electronic device according to claim 10, wherein the processor is further configured to perform:
sending a cancellation instruction to the server corresponding to the first account, the cancellation instruction being configured to instruct the server to cancel the first account.

12. The electronic device according to claim 11, wherein the processor is further configured to perform:
acquiring first authentication information corresponding to the first account and second authentication information corresponding to the second SIM card; and
when determining that the first authentication information matches the second authentication information, registering the second account associated with the second SIM card.

13. The electronic device according to claim 12, wherein, the first authentication information is first user fingerprint information corresponding to the first account and the second authentication information is second user fingerprint information corresponding to the second account associated with the second SIM card.

14. The electronic device according to claim 12, wherein, the first authentication information is a first authentication password corresponding to the first account and the second authentication information is a second authentication password corresponding to the second account associated with the second SIM card.

15. The electronic device according to claim 12, wherein, when determining that the first authentication information matches the second authentication information, registering the second account associated with the second SIM card comprises:
sending a register request carrying information of the second SIM card, so as to instruct the server to register the second account.

16. The electronic device according to claim 10, wherein the processor is further configured to perform:
sending a backup instruction to the server corresponding to the first account according to the predetermined data backup process, the backup instruction being configured to instruct the server to back up the data corresponding to the first account to the second account.

17. The electronic device according to claim 10, wherein the processor is further configured to perform:
sending an instruction to the server according to the predetermined data backup process, the instruction being configured to instruct the server to transmit the data corresponding to the first account to the terminal;
receiving the data corresponding to the first account from the server; and
after detecting that data updating occurs, uploading updated data to a storage space corresponding to the second account in the server, the updated data comprising the data corresponding to the first account.

* * * * *